United States Patent [19]

Cederqvist et al.

[11] 4,254,823
[45] Mar. 10, 1981

[54] PROCESS FOR SEPARATING MINERAL WOOL FIBERS FROM NONFIBROUS MATERIALS

[75] Inventors: Nils G. Cederqvist, Lerdala; Karl M. E. Hellsten, Odsmal; Kerstin E. Henriksson, Kode; Lars A. S. Waag, Stenungsund, all of Sweden

[73] Assignee: Berol Kemi AB, Stenungsund, Sweden

[21] Appl. No.: 791,456

[22] Filed: Apr. 27, 1977

Related U.S. Application Data

[63] Continuation-in-part of Ser. No. 658,137, Feb. 13, 1976, abandoned.

[30] Foreign Application Priority Data

Feb. 13, 1975 [SE] Sweden .............................. 7501637

[51] Int. Cl.³ ............................................. D21B 1/00
[52] U.S. Cl. ..................................... 165/55; 162/152; 162/158; 209/3
[58] Field of Search ................ 162/158, 55, 152, 145; 209/2, 3, 9, 12, 173; 65/9, 10

[56] References Cited

U.S. PATENT DOCUMENTS

| | | | |
|---|---|---|---|
| 2,432,127 | 12/1947 | Schlosser et al. | 162/158 |
| 3,055,498 | 9/1942 | Megumi | 209/2 |
| 3,300,372 | 1/1967 | Bauer | 162/145 |
| 3,865,315 | 2/1975 | Roberts et al. | 209/3 |

FOREIGN PATENT DOCUMENTS

| | | | |
|---|---|---|---|
| 2256239 | 5/1973 | Fed. Rep. of Germany . | |
| 2314060 | 10/1974 | Fed. Rep. of Germany | 162/158 |
| 49-43485 | 11/1974 | Japan | 162/152 |

*Primary Examiner*—William F. Smith

[57] ABSTRACT

A process is provided for the separation of nonfibrous material from mineral wool fibers which comprises dispersing the fibers in an aqueous solution comprising a surfactant having at least one hydrophobic group containing at least eight carbon atoms and at least one cationic hydrophilic group having at least one nitrogen or sulfur atom, such as a quaternary ammonium surfactant. The fibrous material is dispersible in the surfactant solution, while the nonfibrous material is not and consequently can be separated by centrifuging or settling and decantation.

17 Claims, No Drawings

PROCESS FOR SEPARATING MINERAL WOOL FIBERS FROM NONFIBROUS MATERIALS

This application is a continuation-in-part of Ser. No. 658,137, filed Feb. 13, 1976, and now abandoned.

Mineral wool fibers are customarily prepared from silicate-containing raw material by melt spinning. Several procedures are used. The fibers can for example be spun centrifugally from a spinning rotor, and collected on a foraminous surface. A stream of molten silicate material also can be impinged upon a rapidly rotating disc, which throws the molten material out centrifugally, and in the course of so doing the molten material is attenuated into fibrous form. In both procedures, there is formed at the same time a considerable amount of nonfibrous particulate material, known as shot or beads. The nonfibrous material can amount to from about 20 to about 40% of the total weight of the fibrous product, the remainder being fibrous material.

The nonfibrous particulate material is an undesirable component of the mineral wool, because it reduces absorption properties, insulating capacity, and mechanical strength. Moreover, the particulate material can be so fine as to become air-borne as dust, and become distributed over a wide area. Since the dust can cause skin irritation and other injuries, particularly if inhaled, this can pose a considerable problem during conversion of mineral wool into other useful products, such as insulation, and filters. Consequently, it is desirable that it be removed before the mineral wool fibrous material is marketed, but this is rather difficult to do. Since it is made of the same material as the fibers, it cannot be dissolved out, nor does it have a differing density, which would facilitate separation by other techniques, such as by a gas cyclone. Separation even when it is possible is nearly always incomplete, since no method is reliable in removing all of the nonfibrous material.

In accordance with the invention, a process is provided for removing substantially all of such nonfibrous material, if not quantitatively, from the mineral wool fibrous material. It has been found that the fibrous material can be dispersed in an aqueous solution of a cationic surfactant having at least one hydrophobic group containing at least eight carbon atoms and at least one cationic hydrophilic group having at least one nitrogen atom or one sulphur atom, forming a suspension or dispersion which is sufficiently stable that the nonfibrous material, which is not suspended or dispersed in the solution or slurry, can be separated by settling and decantation, or by centrifuging, such as in a hydrocyclone. The separated fibrous material substantially free from nonfibrous material can then be recovered from the surfactant solution by filtration, or by settling and decantation, or by centrifuging.

The separation process of the invention takes advantage of the different physical forms of the fibrous and nonfibrous materials. Fibrous material because of its greater length and relatively small diameter is more readily suspended in water than nonfibrous material, and when it is suspended, settles out more slowly. This tendency is insufficient to enable separation when only water is used as the dispersing medium, but when the aqueous suspending medium contains a cationic surfactant in accordance with the invention, the tendency is accentuated enough to make it possible to separate substantially all of the nonfibrous material before the fibrous material has settled out.

The cationic surfactant greatly increases the stability of a slurry containing mineral wool fibers. Evidently, there is a charge or similar attractive effect which assists in maintaining the fibers in dispersion, possibly because the cationic surfactant in some way becomes attached or attracted to the fibers, and thereby, since it is dissolved, assists in retaining them in dispersion. A similar effect is not noted with the nonfibrous material, probably due to the different dimensions of the particles, as a result of which the separation is greatly facilitated.

The process of the invention is rather simple to carry out. All that is necessary is that the mixture of nonfibrous and fibrous mineral wool material be mixed in an aqueous solution of a cationic surfactant.

The concentration of the surfactant is not critical, and can be within the range from about 0.001 to about 5%, and preferably within the range from about 0.01 to about 3%, by weight of the mineral wool fibers to fibrous material. By "cationic surfactant" is to be understood that an aqueous solution containing 1% of the cationic surfactant has a surface tension of below 50 dynes per centimeter at 25° C.

The mineral wool material containing fibrous and nonfibrous material can be thoroughly mixed with this aqueous solution, so that the mineral wool material content thereof, including both fibrous and nonfibrous material, is within the range from about 0.1 to about 4%, and preferably from about 0.2 to about 1%. The mineral wool fibrous material will become dispersed while the nonfibrous material will not.

The resulting dispersion or slurry can be passed through a hydrocyclone, as a result of which the nonfibrous nonsuspended material will be withdrawn with the heavier fraction, at the apex end outlet of the cyclone, while the fibrous slurry will be withdrawn with the lighter fraction at the base end outlet of the cyclone. Centrifugal force applied in any other apparatus such as a centrifuge will also be effective.

If hydrocyclones or suitable mechanical equipment for centrifuging be not available, the separation can suitably be effected by settling and decantation, simply decanting the supernatant fibrous dispersion or slurry from the layer of nonfibrous material which settles out at the bottom of the vessel dispersion or slurry.

The process of the invention is applicable to any synthetic silicate-containing mineral wool fibrous material. The term "synthetic silicate containing mineral wool fibers" refers to mineral wool fibrous material prepared by melt spinning, melt blowing, or other mechanical spinning method, from molten glass, slag, mixed silicates, silicate rock or ore, or other silicate-containing material. The mineral wool fibers can be of any length, whether short or long, and of any diameter, whether fine or coarse. The fact that the material is in fibrous form, as opposed to nonfibrous form, is sufficient to permit the separation to be carried out.

As the cationic surfactant there can be used any cationic surfactant whether truly cationic or ampholytic or zwitterionic in character. A preferred class of these cationic surfactants are the quaternary ammonium surfactants having the formula

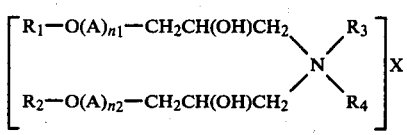

wherein:
R$_1$ and R$_2$ independently are hydrocarbon groups having from about 8 to about 40 carbon atoms;
R$_3$ and R$_4$ independently are methyl, ethyl, or hydroxyethy;
each A is an oxyalkylene group derived from an alkylene oxide having from two to four carbon atoms;
n$_1$ and n$_2$ independently are numbers from 0 to 20; and
X is an anion.

Particularly preferred compounds of said formula are those wherein R$_1$ and R$_2$ independently are aliphatic groups of having from 8 to about 16 carbon atoms, R$_3$ and R$_4$ are methyl, A is an oxyethylene group derived from ethylene oxide, and n$_1$ and n$_2$ independently are numbers from zero to 6.

Other suitable quaternary ammonium surfactants are those of the general formula

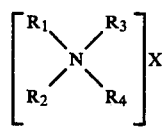

wherein R$_1$ and R$_2$ independently are aliphatic groups having from about 10 to about 22 carbon atoms, and R$_3$ and R$_4$ independently are methyl, ethyl or hydroxyethyl.

Surface-active primary, secondary and tertiary amines also have a very satisfactory effect and among these compounds, primary alkylene ether amines having at least one long aliphatic chain of from about 10 to about 22 carbon atoms are preferred.

Another group of cationic surfactants possessing excellent properties are imidazolines, imidazoles and their quaternary analogues. Specific examples of such compounds are imidazolines of the general formula

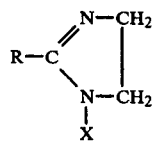

wherein:
R is a hydrocarbon group having from about 10 to about 22 carbon atoms; and
X is hydrogen, hydroxyalkyl, or aminoalkyl having from 1 to about 6 carbon atoms in the alkyl.

A further group of suitable surfactants are the amine oxides, represented by the general formula

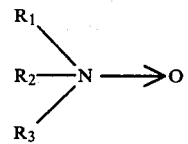

wherein:
R$_1$ is a hydrocarbon group having from about 8 to about 16 carbon atoms; and
R$_2$ and R$_3$ independently are methyl, ethyl or hydroxyethyl.

In addition to the purely cationic surfactants, ampholytic surfactants can be used.

Preferred ampholytic surfactants are those containing a quaternary nitrogen atom. Examples of such compounds are the betaines and sulphobetaines of the general formulae

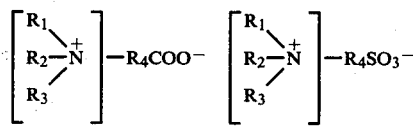

wherein:
R$_1$, R$_2$, and R$_3$ are alkyl having from 1 to about 22 carbon atoms, alkylphenyl wherein the alkyl has from about 1 to about 18 carbon atoms; and
R$_4$ is a bivalent hydrocarbon group having from 1 to about 22 carbon atoms, the number of carbon atoms joining the nitrogen with the carboxylic or sulphonic acid groups suitably being from 1 to about 8, preferably not more than 3.

Another ampholytic surfactant containing quaternary nitrogen having very good properties is that of the general formula

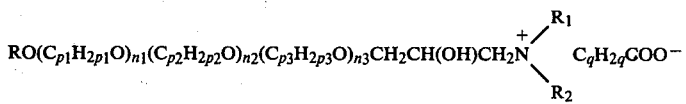

wherein:
R is an aliphatic or cycloaliphatic group having from about 6 to about 22 carbon atoms or an aromatic group substituted by one or more alkyl groups having a total of from about 4 to about 18 carbon atoms in the alkyl;
R$_1$ and R$_2$ independently are alkyl having from 1 to about 3 carbon atoms;
p$_1$, p$_2$ and p$_3$ independently are 2, 3 or 4;
n$_1$, n$_2$, and n$_3$ independently are integers from 0 to 10, the sum of n$_1$, n$_2$ and n$_3$ not exceeding 10; and
q is the interger 1, 2 or 3.

Especially good properties are possessed by those compounds wherein nitrogen atoms and carboxylic groups are joined to the same carbon atom, and preferably q represents the integer 1. Further, compounds wherein p$_1$, p$_2$ and p$_3$ are each 2 or wherein n$_1$, n$_2$ and n$_3$ are each 0 are preferred.

Other useful ampholytic surfactants are those containing a secondary or tertiary nitrogen atom. Examples of such compounds are monoalkylamino monocarboxylic acids, monalkylamino dicarboxylic acids, and dialkylamino monocarboxylic acids of the general formulae

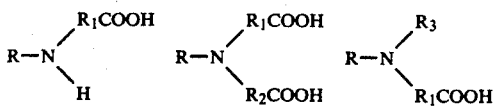

wherein:
R is alkyl having from about 10 to about 22 carbon atoms or alkylphenyl wherein the alkyl has from 1 to about 18 carbon atoms;
$R_1$ and $R_2$ are bivalent hydrocarbon groups having from 1 to about 8 carbon atoms;
$R_3$ is alkyl having from 1 to about 12 carbon atoms; and salts thereof with an alkali metal, alkaline earth metal, ammonium, or amine.

Especially preferred compounds within said groups are dodecylamino acetic acid, cetylamino acetic acid, oleylamino acetic acid, dodecylimino diacetic acid, cetylimino diacetic acid, N-methyl-N-octyl-amino acetic acid, N,N-dihexylamino acetic acid, N,N-dioctylamino acetic acid, N,N-dinonylamino acetic acid, N,N-didoceylamino acetic acid, N-methyl-N-dodecylamino acetic acid, and N-methyl-N-cetylamino acetic acid.

A further group of ampholytic surfactants that can be used advantageously are substituted imidazoline carboxylates. Their structure is a matter of dispute, but usually they are represented by the general formula

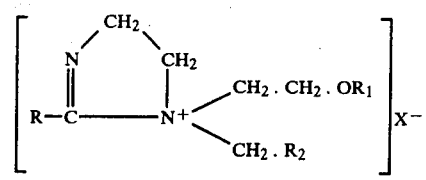

wherein:
R is a straight or branched, saturated or unsaturated aliphatic group having from about 8 to about 22 carbon atoms;
$R_1$ is hydrogen or carboxyl-containing alkyl;
$R_2$ is carboxyl-containing alkyl or sulphonic acid-containing alkyl; and
$X^-$ is a negatively charged ion;
and salts thereof.

The invention is illustrated by the following Examples, which represent preferred embodiments of the invention.

EXAMPLES 1 TO 9

Dry mineral wool fibers containing 30% nonfibrous material in the form of shot and beads, mixed with fibers having an average fiber diameter of 0.004 mm and an average fiber length of 5 mm, were divided in nine batches, each of which was then mixed with the aid of a magnetic stirrer in a 0.1% solution of water of one of the following surfactants in accordance with the invention:

| Example No. | Cationic Surfactant |
|---|---|
| 1 | 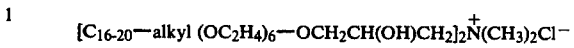 |
| 2 | 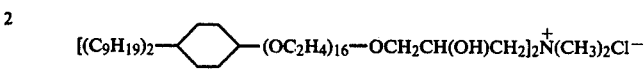 |
| 3 |  |
| 4 | 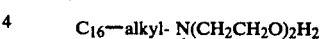  |
| 5 | 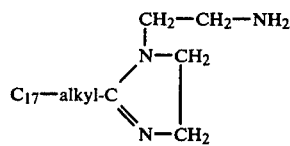 |
| 6 | 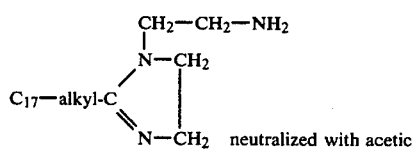 neutralized with acetic acid + tall oil fatty acids |
| 7 | 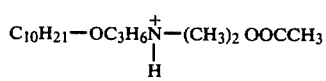 |

| Example No. | Cationic Surfactant |
|---|---|
| | -continued |
| 8 | 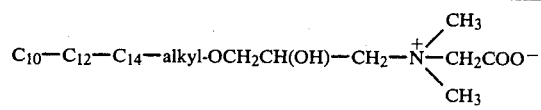 |
| 9 | 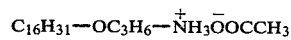 |

Dispersion of the mineral wool material in the surfactant solution was effected at 25° C. The mineral wool was added to the solution until the fibrous material in the resulting slurry showed a tendency to collect in clumps. Then, the addition of mineral wool was halted, and the total amount of fibrous material that had been dispersed in the solution was determined, by weighing. The following results were obtained:

| Example No. | Mineral Wool (g/100 g solution) |
|---|---|
| 1 | 3.8 |
| 2 | 2.6 |
| 3 | 3.7 |
| 4 | 3.2 |
| 5 | 3.8 |
| 6 | 3.7 |
| 7 | 3.7 |
| 8 | 3.7 |
| 9 | 3.7 |
| Control (no surfactant) | 0.5 |

Each of the suspensions was placed in a centrifuge, from which fibrous material was withdrawn at the center and nonfibrous material withdrawn at the periphery. The separate fractions were then filtered and the amount of solid material recovered on the filter from each was noted by weighing, with the following results:

| Example No. | Mineral Wool fibers Recovered (g) | Percentage Recovered Mineral Wool fibers | Nonfibrous Mineral Wool Material Recovered (g) |
|---|---|---|---|
| 1 | 2.7 | 71 | 1.1 |
| 2 | 1.6 | 62 | 1.0 |
| 3 | 2.5 | 68 | 1.2 |
| 4 | 2.1 | 66 | 1.1 |
| 5 | 2.7 | 71 | 1.1 |
| 6 | 2.5 | 68 | 1.2 |
| 7 | 2.6 | 70 | 1.1 |
| 8 | 2.4 | 65 | 1.3 |
| 9 | 2.4 | 65 | 1.3 |
| Control (no surfactant) | 0.2 | 40 | 0.3 |

It is apparent from the above results that the separation of nonfibrous material from fibrous material was virtually quantitative.

EXAMPLES 10 TO 18

Dry mineral wool fibers containing 40% nonfibrous material in the form of shot and beads, mixed with fibers having an average fiber diameter of 0.004 mm and an average fiber length of 5 mm, were divided into nine batches, each of which was then mixed with the aid of a magnetic stirrer in a 0.01% solution of water of one of the following surfactants in accordance with the invention:

| Example No. | Cationic Surfactant |
|---|---|
| 10 |  |
| 11 | 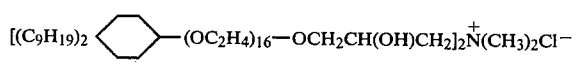 |
| 12 |  |
| 13 | 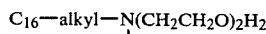 |
| 14 | 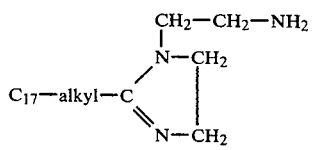 |

-continued

| Example No. | Cationic Surfactant |
|---|---|
| 15 | 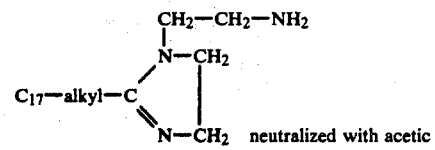 neutralized with acetic acid + tall oil fatty acids |
| 16 | 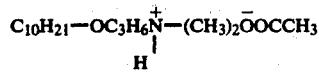 |
| 17 |  |
| 18 |  |

Dispersion of the mineral wool material in the surfactant solution was effected at 25° C. The mineral wool was added to the solution until the fibrous material in the resulting slurry showed a tendency to collect in clumps was noted. Then, the addition of mineral wool was halted, and the total amount of fibrous material that had been dispersed in the solution was determined, by weighing. The following results were obtained:

| Example No. | Mineral Wool (g/100 g solution) |
|---|---|
| 10 | 2.7 |
| 11 | 2.6 |
| 12 | 3.7 |
| 13 | 2.6 |
| 14 | 3.3 |
| 15 | 3.7 |
| 16 | 3.7 |
| 17 | 3.3 |
| 18 | 3.3 |
| Control (no surfactant) | 0.5 |

Each of the suspensions was placed in a centrifuge, from which fibrous material was withdrawn at the center and nonfibrous material withdrawn at the periphery. The separate fractions were then filtered and the amount of solid material recovered on the filter from each was noted by weighing, with the following results:

| Example No. | Mineral Wool fibers Recovered (g) | Percentage Recovered Mineral Wool fibers | Nonfibrous Mineral Wool Material Recovered (g) |
|---|---|---|---|
| 10 | 1.7 | 63 | 1.0 |
| 11 | 1.7 | 65 | 0.9 |
| 12 | 2.6 | 70 | 1.1 |
| 13 | 1.7 | 65 | 0.9 |
| 14 | 2.2 | 67 | 1.1 |
| 15 | 2.6 | 70 | 1.1 |
| 16 | 2.7 | 73 | 1.0 |
| 17 | 2.2 | 67 | 1.1 |
| 18 | 2.1 | 64 | 1.2 |
| Control (no surfactant) | 0.2 | 40 | 0.3 |

It is apparent from the above results that the separation of nonfibrous material from fibrous material was virtually quantitative.

Having regard to the foregoing disclosure, the following is claimed as the inventive and patentable embodiments thereof:

1. A process for removing substantially all nonfibrous material from mineral wool fibrous material, which comprises dispersing an amount within the range from about 0.1 to about 4% mineral wool material comprising from about 20 to about 40% by weight nonfibrous material and the remainder mineral wool fibrous material in an aqueous solution of a cationic surfactant having at least one hydrophobic group containing at least eight carbon atoms and at least one cationic hydrophilic group having at least one nitrogen atom or one sulphur atom, thereby forming a suspension of the fibrous material substantially free from nonfibrous material that is sufficiently stable to permit separation of the nonfibrous material therefrom; separating the nondispersed nonfibrous mineral wool material from the dispersed fibrous material; and then recovering the mineral wool fibrous material substantially free from nonfibrous material from the surfactant solution.

2. A process according to claim 1 in which the nonfibrous material is separated by settling and decantation.

3. A process according to claim 1 in which the nonfibrous material is separated by centrifuging.

4. A process according to claim 1 in which the cationic surfactant is a truly cationic surfactant.

5. A process according to claim 1 in which the cationic surfactant ia an ampholytic surfactant.

6. A process according to claim 1 in which the cationic surfactant is a quaternary ammonium surfactant having the formula

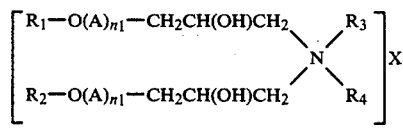

wherein:
$R_1$ and $R_2$ are each hydrocarbon groups having from about eight to about forty carbon atoms;
$R_3$ and $R_4$ are each selected from the group consisting of methyl, ethyl, and hydroxyethyl;

each A is an oxyalkylene group having from two to four carbon atoms;

$n_1$ and $n_2$ are numbers within the range from 0 to 20; and

X is an anion.

7. A process according to claim 1 in which the cationic surfactant is a quaternary ammonium surfactant having the general formula

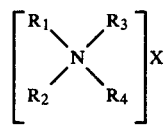

wherein $R_1$ and $R_2$ are each aliphatic groups having from about ten to about twenty-two carbon atoms, and $R_3$ and $R_4$ are each selected from the group consisting of methyl, ethyl and hydroxyethyl.

8. A process according to claim 1 in which the cationic surfactant is a primary alkylene ether amine having at least one aliphatic group having from about ten to about twenty-two carbon atoms.

9. A process according to claim 1 in which the cationic surfactant is an imidazoline having the general formula

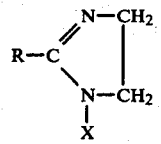

wherein:
R is a hydrocarbon group having from about ten to about twenty-two carbon atoms; and
X is selected from the group consisting of hydrogen, hydroxyalkyl and aminoalkyl having from one to about six carbon atoms in the alkyl.

10. A process according to claim 1 in which the cationic surfactant is an amine oxide having the general formula

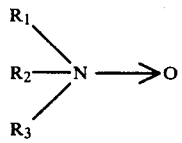

wherein:
$R_1$ is a hydrocarbon group having from about eight to about sixteen carbon atoms; and
$R_2$ and $R_3$ are each methyl, ethyl or hydroxyethyl.

11. A process according to claim 1 in which the cationic surfactant is a betaine having the general formula

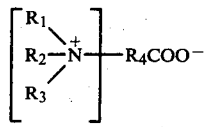

wherein:
$R_1$, $R_2$, and $R_3$ are each selected from the group consisting of alkyl having from one to about twenty-two carbon atoms and alkylphenyl wherein the alkyl has from about one to about eighteen carbon atoms; and $R_4$ is a bivalent hydrocarbon group having from 1 to about 22 carbon atoms, the number of carbon atoms joining the nitrogen with the carboxylic or sulphonic acid groups being from 1 to about 8.

12. A process according to claim 1 in which the cationic surfactant is a sulpho-betaine having the general formula

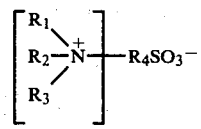

wherein:
$R_1$, $R_2$, and $R_3$ are each selected from the group consisting of alkyl having from one to about twenty-two carbon atoms and alkylphenyl wherein the alkyl has from about one to about eighteen carbon atoms; and $R_4$ is a bivalent hydrocarbon group having from 1 to about 22 carbon atoms, the number of carbon atoms joining the nitrogen with the carboxylic or sulphonic acid groups being from 1 to about 8.

13. A process according to claim 1 in which the cationic surfactant has the general formula

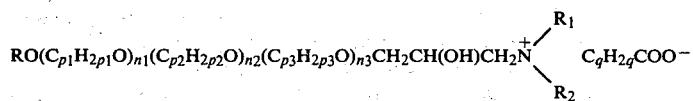

wherein:
R is selected from the group consisting of aliphatic and cycloaliphatic groups having from about six to about twenty-two carbon atoms and aromatic groups substituted by one or more alkyl groups having a total of from about four to about eighteen carbon atoms in the alkyl;

$R_1$ and $R_2$ are each alkyl having from one to about three carbon atoms;

$p_1$, $p_2$ and $p_3$ are each 2, 3 or 4;

$n_1$, $n_2$ and $n_3$ are each numbers from 0 to 10, the sum of $n_1$, $n_2$ and $n_3$ not exceeding 10; and q is 1, 2 or 3.

14. A process according to claim 1 in which the cationic surfactant is selected from the group consisting of (a) monoalkylamino monocarboxylic acids, (b) monalkylamino dicarboxylic acids, and (c) dialkylamino monocarboxylic acids having the general formulae

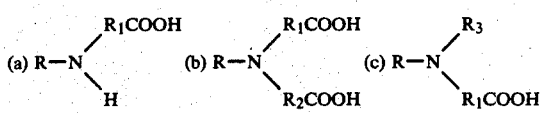

respectively, wherein:

R is selected from the group consisting of alkyl having from about ten to about twenty-two carbon atoms and alkylphenyl wherein the alkyl has from one to about eighteen carbon atoms;

$R_1$ and $R_2$ are each bivalent hydrocarbon groups having from one to about eight carbon atoms;

$R_3$ is alkyl having from one to about twelve carbon atoms;

and salts thereof with a cation selected from the group consisting of alkali metal, alkaline earth metal, ammonium, and amine.

15. A process according to claim 1 in which the cationic surfactant is an imidazoline carboxylate or sulphonate having the general formula

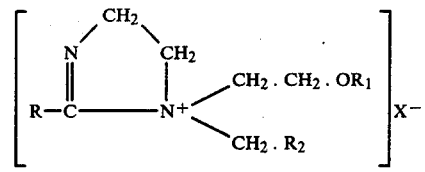

wherein:

R is an aliphatic group having from about eight to about twenty-two carbon atoms;

$R_1$ is selected from the group consisting of hydrogen or carboxyalkyl;

$R_2$ is selected from the group consisting of carboxyalkyl or sulphonic acid-containing alkyl; and $X^-$ is an anion and salts thereof.

16. A process according to claim 1 in which the cationic surfactant is added in an amount within the range from about 0.001 to about 5% by weight of the mineral wool fibrous material.

17. A process according to claim 1 in which the cationic surfactant is added in an amount with the range from about 0.01 to about 3% by weight of the mineral wool fibrous material.

* * * * *

UNITED STATES PATENT AND TRADEMARK OFFICE
CERTIFICATE OF CORRECTION

PATENT NO. : 4,254,823
DATED : March 10, 1981
INVENTOR(S) : Nils G. Cederqvist et al It is certified that error appears in the above—identified patent and that said Letters Patent is hereby corrected as shown below:

Column 9, Formula 16 :

$$16 \quad C_{10}H_{21}-OC_3H_6\overset{+}{\underset{H}{N}}-(CH_3)_2\overset{-}{O}OCCH_3$$

should be $$C_{10}H_{21}-OC_3H_6\overset{+}{\underset{H}{N}}-(CH_3)_2\overset{-}{O}OCCH_3$$

Signed and Sealed this

Sixteenth Day of April 1985

[SEAL]

Attest:

DONALD J. QUIGG

Attesting Officer     Acting Commissioner of Patents and Trademarks